US011527086B2

(12) United States Patent
Krishnamoorthy et al.

(10) Patent No.: US 11,527,086 B2
(45) Date of Patent: *Dec. 13, 2022

(54) SYSTEM FOR CHARACTER RECOGNITION IN A DIGITAL IMAGE PROCESSING ENVIRONMENT

(71) Applicant: BANK OF AMERICA CORPORATION, Charlotte, NC (US)

(72) Inventors: Madhusudhanan Krishnamoorthy, Chennai (IN); Nityashree Pannerselvam, Chennai (IN)

(73) Assignee: BANK OF AMERICA CORPORATION, Charlotte, NC (US)

(*) Notice: Subject to any disclaimer, the term of this patent is extended or adjusted under 35 U.S.C. 154(b) by 0 days.

This patent is subject to a terminal disclaimer.

(21) Appl. No.: 17/504,833

(22) Filed: Oct. 19, 2021

(65) Prior Publication Data

US 2022/0036061 A1    Feb. 3, 2022

Related U.S. Application Data

(63) Continuation of application No. 16/910,831, filed on Jun. 24, 2020, now Pat. No. 11,176,362.

(51) Int. Cl.
| | | |
|---|---|---|
| *G06V 30/40* | (2022.01) | |
| *G06T 5/10* | (2006.01) | |
| *G06T 5/00* | (2006.01) | |
| *G06V 30/144* | (2022.01) | |

(52) U.S. Cl.
CPC ............. *G06V 30/40* (2022.01); *G06T 5/003* (2013.01); *G06T 5/10* (2013.01); *G06V 30/144* (2022.01)

(58) Field of Classification Search
CPC .. G06V 30/40; G06V 30/144; G06V 30/1902; G06T 5/003; G06T 5/10
See application file for complete search history.

(56) References Cited

U.S. PATENT DOCUMENTS

| | | | |
|---|---|---|---|
| 6,028,956 A | 2/2000 | Shustorovich et al. | |
| 7,664,343 B2 | 2/2010 | Withum et al. | |
| 7,876,352 B2 | 1/2011 | Martin | |
| 8,965,112 B1 | 2/2015 | Ibarz et al. | |

(Continued)

FOREIGN PATENT DOCUMENTS

WO    WO-2019092672 A2 *   5/2019   ........... G06F 16/532

*Primary Examiner* — Casey L Kretzer
(74) *Attorney, Agent, or Firm* — Moore & Van Allen PLLC; Anup Shrinivasan Iyer

(57) ABSTRACT

Systems, computer program products, and methods are described herein for character recognition in a digital image processing environment. The present invention is configured to electronically retrieve one or more documents from a document repository, wherein the one or more documents are in an image format; initiate one or more image super resolution algorithms on the one or more documents; generate, based on at least the one or more image super resolution algorithms, one or more high-resolution images associated with each of the one or more documents; initiate one or more image bottleneck ensembles (IBE) algorithms on the one or more high-resolution images; extract, using the one or more IBE algorithms, one or more features associated with the one or more high resolution images; and store the one or more features extracted from the one or more high resolution images in a feature repository.

19 Claims, 4 Drawing Sheets

(56) References Cited

U.S. PATENT DOCUMENTS

| | | |
|---|---|---|
| 9,251,431 B2 | 2/2016 | Doepke et al. |
| 10,007,863 B1 | 6/2018 | Pereira et al. |
| 10,102,453 B1 | 10/2018 | Yang et al. |
| 10,275,646 B2 | 4/2019 | Yang et al. |
| 10,366,328 B2 | 7/2019 | Yang et al. |
| 10,482,162 B2 | 11/2019 | Cai et al. |
| 2003/0123732 A1 | 7/2003 | Miyazaki et al. |
| 2004/0189618 A1* | 9/2004 | Perry ................. G06T 7/60 345/179 |
| 2008/0008383 A1 | 1/2008 | Andel et al. |
| 2011/0222724 A1 | 9/2011 | Yang et al. |
| 2014/0363074 A1 | 12/2014 | Dolfing et al. |
| 2015/0117760 A1 | 4/2015 | Wang et al. |
| 2017/0024626 A1 | 1/2017 | Inaba |
| 2017/0177965 A1 | 6/2017 | Gordo Soldevila et al. |
| 2018/0025256 A1 | 1/2018 | Bai et al. |
| 2018/0082123 A1 | 3/2018 | Katz et al. |
| 2018/0107877 A1 | 4/2018 | Inaba |
| 2018/0285630 A1* | 10/2018 | Han ................. G06V 40/172 |
| 2020/0110930 A1* | 4/2020 | Simantov ............. G06V 30/412 |
| 2020/0320291 A1* | 10/2020 | Sanjar ................. G06V 30/418 |
| 2021/0149962 A1* | 5/2021 | Yin ................. G06F 16/93 |

\* cited by examiner

SYSTEM FOR CHARACTER RECOGNITION IN A DIGITAL IMAGE PROCESSING ENVIRONMENT

CROSS-REFERENCE TO RELATED APPLICATION

The present application is a continuation of co-pending U.S. patent application Ser. No. 16/910,831, of the same title and filed on Jun. 24, 2020, which is assigned to the assignee hereof and the contents thereof are hereby expressly incorporated by reference herein.

FIELD OF THE INVENTION

The present invention embraces a system for character recognition in a digital image processing environment.

BACKGROUND

In deep learning, a convolutional neural network (CNN, or ConvNet) is a class of deep neural networks, most commonly applied to analyzing visual imagery. OCR (optical character recognition) is the recognition of printed or written text characters by a computer. This involves photo-scanning of the text character-by-character, analysis of the scanned-in image, and then translation of the character image into character codes, such as ASCII, commonly used in data processing. CNNs can be leveraged to recognize text characters without the need to photo-scan the text character-by-character.

There is a need for a system for character recognition in a digital image processing environment by leveraging the advantages provided by CNNs.

SUMMARY

The following presents a simplified summary of one or more embodiments of the present invention, in order to provide a basic understanding of such embodiments. This summary is not an extensive overview of all contemplated embodiments, and is intended to neither identify key or critical elements of all embodiments nor delineate the scope of any or all embodiments. Its sole purpose is to present some concepts of one or more embodiments of the present invention in a simplified form as a prelude to the more detailed description that is presented later.

In one aspect, a system for character recognition in a digital image processing environment is presented. The system comprising: at least one non-transitory storage device; and at least one processing device coupled to the at least one non-transitory storage device, wherein the at least one processing device is configured to: electronically retrieve one or more documents from a document repository, wherein the one or more documents are in an image format; initiate one or more image super resolution algorithms on the one or more documents; generate, based on at least the one or more image super resolution algorithms, one or more high-resolution images associated with each of the one or more documents; initiate one or more image bottleneck ensembles (IBE) algorithms on the one or more high-resolution images; extract, using the one or more IBE algorithms, one or more features associated with the one or more high resolution images; and store the one or more features extracted from the one or more high resolution images in a feature repository.

In some embodiments, the at least one processing device is further configured to: electronically receive a query from a computing device associated with a user, wherein the query is in a text format; generate an image of the query, wherein generating further comprises converting the query from the text format to an image format; initiate one or more feature extraction algorithms on the image of the query; extract, using the one or more feature extraction algorithms, one or more features associated with the image of the query.

In some embodiments, the one or more features associated with the image of the query comprises one or more sets of ordered points that define one or more contours of one or more portions of the image of the query.

In some embodiments, the at least one processing device is further configured to: determine that the one or more documents retrieved from the document repository are associated with one or more unique fonts; initiate a data normalization algorithm on the one or more documents; normalize, using the data normalization algorithm, the one or more documents, wherein normalizing further comprises at least transforming the one or more fonts to a first font; and initiate the one or more image super resolution algorithms on the one or more documents, wherein the one or more documents are associated with the first font.

In some embodiments, the at least one processing device is further configured to: electronically receive the query from the computing device of the user, wherein the query is associated with an original font; initiate the data normalization algorithm on the query; normalize, using the data normalization algorithm, the query, wherein normalizing further comprises transforming the original font of the query to the first font; and generate the image of the query, wherein the query is associated with the first font.

In some embodiments, the at least one processing device is further configured to: electronically retrieve the one or more features associated with the one or more high resolution images from the feature repository; initiate a sliding window matching algorithm on the one or more features associated with the one or more high resolution images and the one or more features associated with the image of the query; compare, using the sliding window matching algorithm, the one or more features associated with the image of the query with the one or more features associated with the one or more high resolution images; and determine one or more matches between the one or more features associated with the one or more images of the query and the one or more features associated with the one or more high resolution images.

In some embodiments, the at least one processing device is further configured to initiate the sliding window matching algorithm, wherein initiating further comprises: establishing a window with a scale of a predetermined width; sliding, sequentially, the window across a surface of the one or more high resolution images at one or more predetermined incremental steps; identifying at least a portion of the one or more features associated with the one or more high resolution images within the window at each of the one or more predetermined incremental steps; comparing the one or more features associated with the image of the query with at least the portion of the one or more features associated with the one or more high resolution images identified within the window at each of the one or more predetermined incremental steps; and determine the one or more matches between the one or more images of the query and at least the portion of the one or more features associated with the one or more high resolution images identified within the scale at each of the one or more predetermined incremental steps.

In some embodiments, the predetermined width associated with the window is based on at least a length of the query, wherein the query is associated with the first font.

In some embodiments, the at least one processing device is further configured to extract the one or more features associated with the one or more high resolution images, wherein extracting further comprises: initiating the one or more IBE algorithms on the one or more high resolution images, wherein the one or more IBE algorithms comprises at least one or more convolutional neural networks; processing the one or more high resolution images using the one or more IBE algorithms in parallel; and extracting one or more preliminary features associated with the one or more high resolution images from each of the one or more IBE algorithms based on at least processing the one or more high resolution images using the one or more IBE algorithms in parallel; and concatenating the one or more preliminary features to generate the one or more features associated with the one or more high resolution images.

In yet another aspect, a computer program product for character recognition in a digital image processing environment is presented. The computer program product comprising a non-transitory computer-readable medium comprising code causing a first apparatus to: electronically retrieve one or more documents from a document repository, wherein the one or more documents are in an image format; initiate one or more image super resolution algorithms on the one or more documents; generate, based on at least the one or more image super resolution algorithms, one or more high-resolution images associated with each of the one or more documents; initiate one or more image bottleneck ensembles (IBE) algorithms on the one or more high-resolution images; extract, using the one or more IBE algorithms, one or more features associated with the one or more high resolution images; and store the one or more features extracted from the one or more high resolution images in a feature repository.

In yet another aspect, a method for character recognition in a digital image processing environment is presented. The method comprising: electronically retrieving one or more documents from a document repository, wherein the one or more documents are in an image format; initiating one or more image super resolution algorithms on the one or more documents; generating, based on at least the one or more image super resolution algorithms, one or more high-resolution images associated with each of the one or more documents; initiating one or more image bottleneck ensembles (IBE) algorithms on the one or more high-resolution images; extracting, using the one or more IBE algorithms, one or more features associated with the one or more high resolution images; and storing the one or more features extracted from the one or more high resolution images in a feature repository.

The features, functions, and advantages that have been discussed may be achieved independently in various embodiments of the present invention or may be combined with yet other embodiments, further details of which can be seen with reference to the following description and drawings.

BRIEF DESCRIPTION OF THE DRAWINGS

Figure 1:
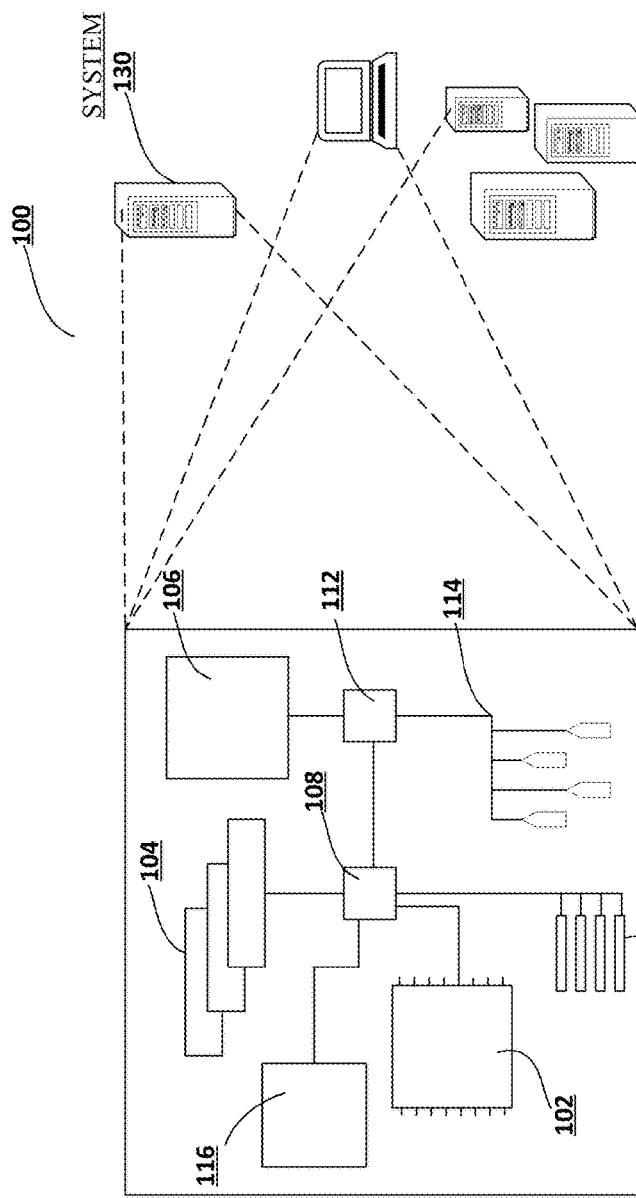
Figure 1:
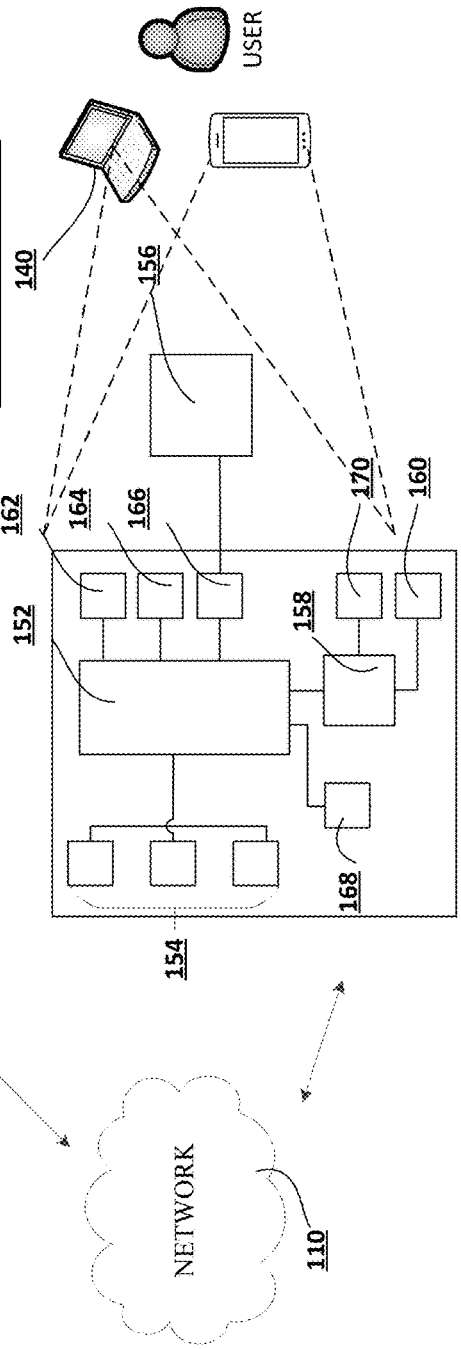
Figure 2:
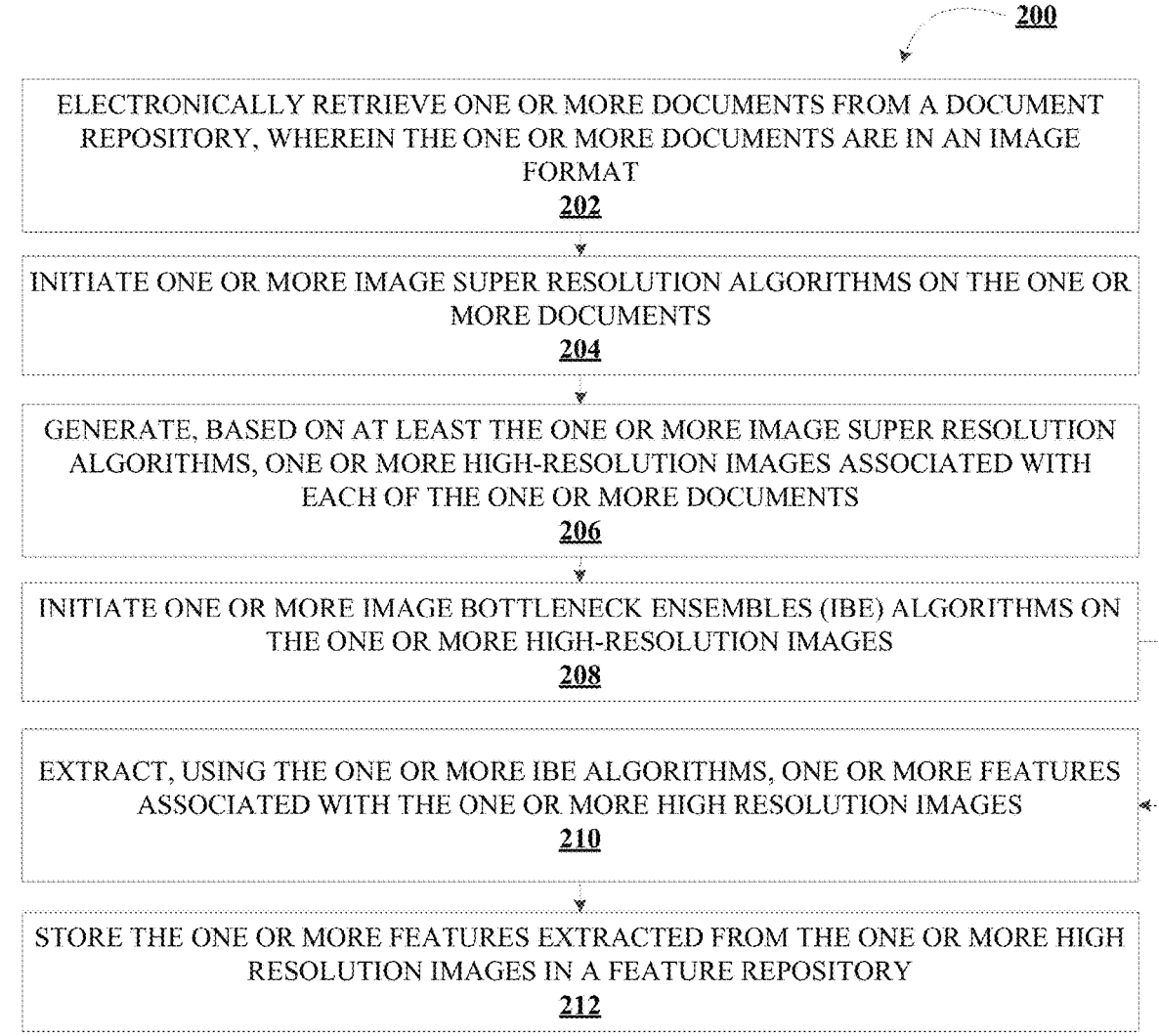
Figure 3:
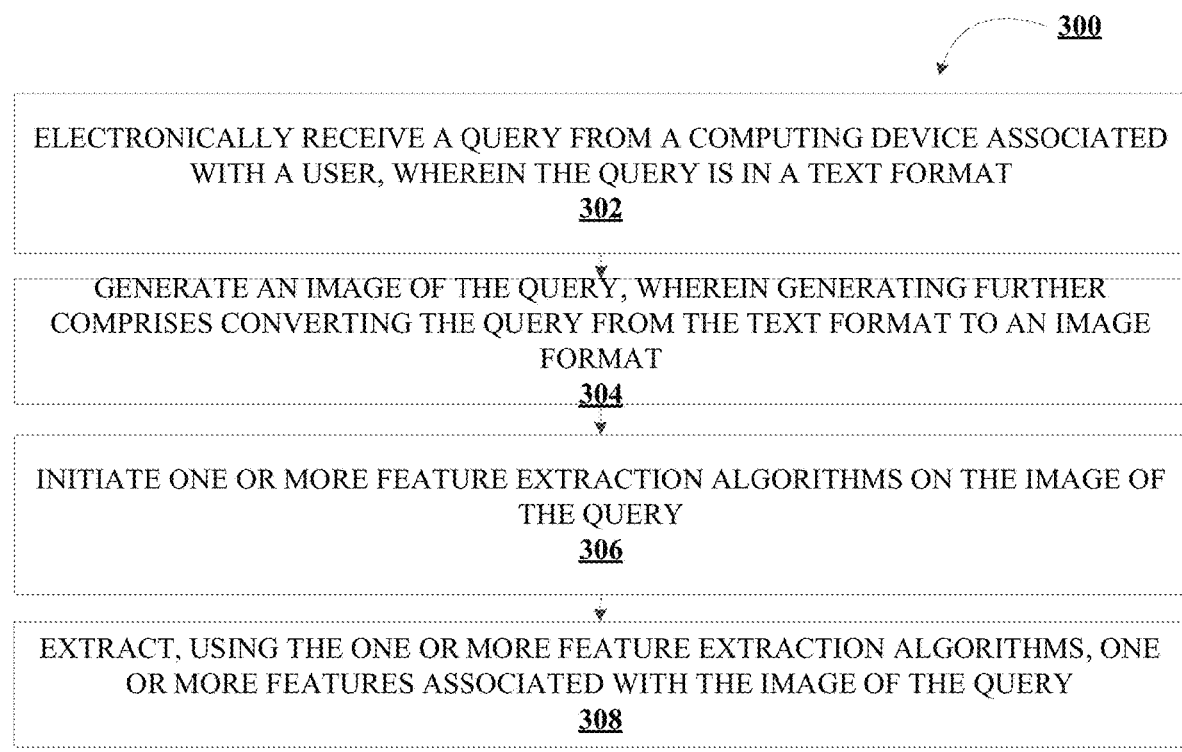
Figure 4:
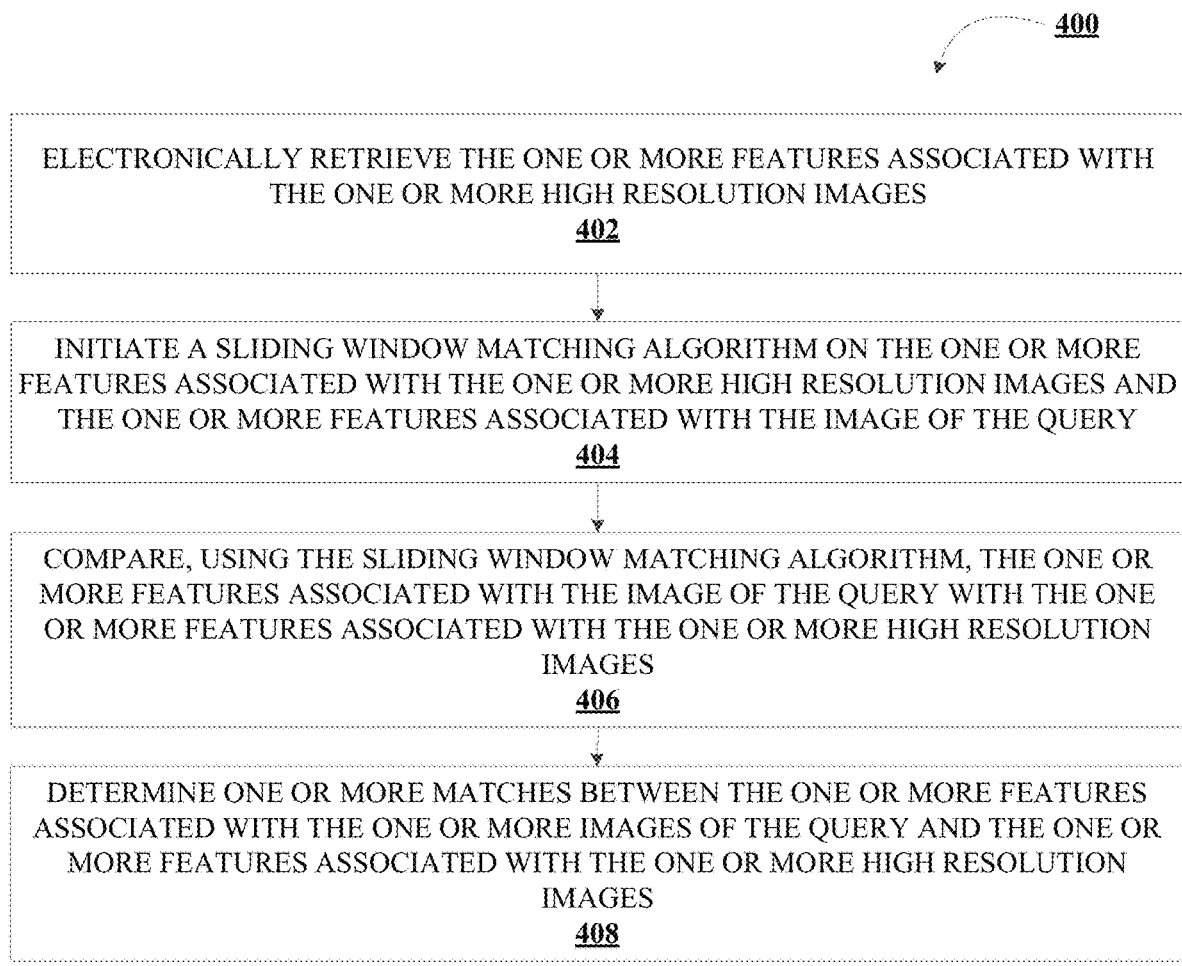

Having thus described embodiments of the invention in general terms, reference will now be made the accompanying drawings, wherein:

FIG. 1 illustrates technical components of a system for character recognition in a digital image processing environment, in accordance with an embodiment of the invention;

FIG. 2 illustrate a process flow for extracting features from high resolution images generated from documents, in accordance with an embodiment of the invention;

FIG. 3 illustrates a process flow for extracting features from an image of a query, in accordance with an embodiment of the invention; and FIG. 4 illustrates a process flow for character recognition in high resolution images, in accordance with an embodiment of the invention, in accordance with an embodiment of the invention.

DETAILED DESCRIPTION OF EMBODIMENTS OF THE INVENTION

Embodiments of the present invention will now be described more fully hereinafter with reference to the accompanying drawings, in which some, but not all, embodiments of the invention are shown. Indeed, the invention may be embodied in many different forms and should not be construed as limited to the embodiments set forth herein; rather, these embodiments are provided so that this disclosure will satisfy applicable legal requirements. Where possible, any terms expressed in the singular form herein are meant to also include the plural form and vice versa, unless explicitly stated otherwise. Also, as used herein, the term "a" and/or "an" shall mean "one or more," even though the phrase "one or more" is also used herein. Furthermore, when it is said herein that something is "based on" something else, it may be based on one or more other things as well. In other words, unless expressly indicated otherwise, as used herein "based on" means "based at least in part on" or "based at least partially on." Like numbers refer to like elements throughout.

As used herein, an "entity" may be any institution employing information technology resources and particularly technology infrastructure configured for processing large amounts of data. Typically, these data can be related to the people who work for the organization, its products or services, the customers or any other aspect of the operations of the organization. As such, the entity may be any institution, group, association, financial institution, establishment, company, union, authority or the like, employing information technology resources for processing large amounts of data.

As described herein, a "user" may be an individual associated with an entity. As such, in some embodiments, the user may be an individual having past relationships, current relationships or potential future relationships with an entity. In some embodiments, a "user" may be an employee (e.g., an associate, a project manager, an IT specialist, a manager, an administrator, an internal operations analyst, or the like) of the entity or enterprises affiliated with the entity, capable of operating the systems described herein. In some embodiments, a "user" may be any individual, entity or system who has a relationship with the entity, such as a customer or a prospective customer. In other embodiments, a user may be a system performing one or more tasks described herein.

As used herein, a "user interface" may be any device or software that allows a user to input information, such as commands or data, into a device, or that allows the device to output information to the user. For example, the user interface includes a graphical user interface (GUI) or an interface to input computer-executable instructions that direct a processing device to carry out specific functions.

The user interface typically employs certain input and output devices to input data received from a user second user or output data to a user. These input and output devices may include a display, mouse, keyboard, button, touchpad, touch screen, microphone, speaker, LED, light, joystick, switch, buzzer, bell, and/or other user input/output device for communicating with one or more users.

As used herein, an "engine" may refer to core elements of a computer program, or part of a computer program that serves as a foundation for a larger piece of software and drives the functionality of the software. An engine may be self-contained, but externally-controllable code that encapsulates powerful logic designed to perform or execute a specific type of function. In one aspect, an engine may be underlying source code that establishes file hierarchy, input and output methods, and how a specific part of a computer program interacts or communicates with other software and/or hardware. The specific components of an engine may vary based on the needs of the specific computer program as part of the larger piece of software. In some embodiments, an engine may be configured to retrieve resources created in other computer programs, which may then be ported into the engine for use during specific operational aspects of the engine. An engine may be configurable to be implemented within any general purpose computing system. In doing so, the engine may be configured to execute source code embedded therein to control specific features of the general purpose computing system to execute specific computing operations, thereby transforming the general purpose system into a specific purpose computing system.

As used herein, an "interaction" may refer to any communication between one or more users, one or more entities or institutions, and/or one or more devices, nodes, clusters, or systems within the system environment described herein. For example, an interaction may refer to a transfer of data between devices, an accessing of stored data by one or more nodes of a computing cluster, a transmission of a requested task, or the like.

FIG. 1 presents an exemplary block diagram of the system environment for character recognition in a digital image processing environment 100, in accordance with an embodiment of the invention. FIG. 1 provides a unique system that includes specialized servers and system communicably linked across a distributive network of nodes required to perform the functions of the process flows described herein in accordance with embodiments of the present invention.

As illustrated, the system environment 100 includes a network 110, a system 130, and a user input system 140. Also shown in FIG. 1 is a user of the user input system 140. The user input system 140 may be a mobile device or other non-mobile computing device. The user may be a person who uses the user input system 140 to execute resource transfers using one or more applications stored thereon. The one or more applications may be configured to communicate with the system 130, execute a transaction, input information onto a user interface presented on the user input system 140, or the like. The applications stored on the user input system 140 and the system 130 may incorporate one or more parts of any process flow described herein.

As shown in FIG. 1, the system 130, and the user input system 140 are each operatively and selectively connected to the network 110, which may include one or more separate networks. In addition, the network 110 may include a telecommunication network, local area network (LAN), a wide area network (WAN), and/or a global area network (GAN), such as the Internet. It will also be understood that the network 110 may be secure and/or unsecure and may also include wireless and/or wired and/or optical interconnection technology.

In some embodiments, the system 130 and the user input system 140 may be used to implement the processes described herein, including the mobile-side and server-side processes for installing a computer program from a mobile device to a computer, in accordance with an embodiment of the present invention. The system 130 is intended to represent various forms of digital computers, such as laptops, desktops, workstations, personal digital assistants, servers, blade servers, mainframes, and other appropriate computers. The user input system 140 is intended to represent various forms of mobile devices, such as personal digital assistants, cellular telephones, smartphones, and other similar computing devices. The components shown here, their connections and relationships, and their functions, are meant to be exemplary only, and are not meant to limit implementations of the inventions described and/or claimed in this document.

In accordance with some embodiments, the system 130 may include a processor 102, memory 104, a storage device 106, a high-speed interface 108 connecting to memory 104, and a low-speed interface 112 connecting to low speed bus 114 and storage device 106. Each of the components 102, 104, 106, 108, 111, and 112 are interconnected using various buses, and may be mounted on a common motherboard or in other manners as appropriate. The processor 102 can process instructions for execution within the system 130, including instructions stored in the memory 104 or on the storage device 106 to display graphical information for a GUI on an external input/output device, such as display 116 coupled to a high-speed interface 108. In other implementations, multiple processors and/or multiple buses may be used, as appropriate, along with multiple memories and types of memory. Also, multiple systems, same or similar to system 130 may be connected, with each system providing portions of the necessary operations (e.g., as a server bank, a group of blade servers, or a multi-processor system). In some embodiments, the system 130 may be a server managed by the business. The system 130 may be located at the facility associated with the business or remotely from the facility associated with the business.

The memory 104 stores information within the system 130. In one implementation, the memory 104 is a volatile memory unit or units, such as volatile random access memory (RAM) having a cache area for the temporary storage of information. In another implementation, the memory 104 is a non-volatile memory unit or units. The memory 104 may also be another form of computer-readable medium, such as a magnetic or optical disk, which may be embedded and/or may be removable. The non-volatile memory may additionally or alternatively include an EEPROM, flash memory, and/or the like. The memory 104 may store any one or more of pieces of information and data used by the system in which it resides to implement the functions of that system. In this regard, the system may dynamically utilize the volatile memory over the non-volatile memory by storing multiple pieces of information in the volatile memory, thereby reducing the load on the system and increasing the processing speed.

The storage device 106 is capable of providing mass storage for the system 130. In one aspect, the storage device 106 may be or contain a computer-readable medium, such as a floppy disk device, a hard disk device, an optical disk device, or a tape device, a flash memory or other similar solid state memory device, or an array of devices, including devices in a storage area network or other configurations. A computer program product can be tangibly embodied in an information carrier. The computer program product may also contain instructions that, when executed, perform one or more methods, such as those described above. The information carrier may be a non-transitory computer- or machine-readable storage medium, such as the memory 104, the storage device 104, or memory on processor 102.

In some embodiments, the system 130 may be configured to access, via the 110, a number of other computing devices (not shown). In this regard, the system 130 may be configured to access one or more storage devices and/or one or more memory devices associated with each of the other computing devices. In this way, the system 130 may implement dynamic allocation and de-allocation of local memory resources among multiple computing devices in a parallel or distributed system. Given a group of computing devices and a collection of interconnected local memory devices, the fragmentation of memory resources is rendered irrelevant by configuring the system 130 to dynamically allocate memory based on availability of memory either locally, or in any of the other computing devices accessible via the network. In effect, it appears as though the memory is being allocated from a central pool of memory, even though the space is distributed throughout the system. This method of dynamically allocating memory provides increased flexibility when the data size changes during the lifetime of an application, and allows memory reuse for better utilization of the memory resources when the data sizes are large.

The high-speed interface 108 manages bandwidth-intensive operations for the system 130, while the low speed controller 112 manages lower bandwidth-intensive operations. Such allocation of functions is exemplary only. In some embodiments, the high-speed interface 108 is coupled to memory 104, display 116 (e.g., through a graphics processor or accelerator), and to high-speed expansion ports 111, which may accept various expansion cards (not shown). In such an implementation, low-speed controller 112 is coupled to storage device 106 and low-speed expansion port 114. The low-speed expansion port 114, which may include various communication ports (e.g., USB, Bluetooth, Ethernet, wireless Ethernet), may be coupled to one or more input/output devices, such as a keyboard, a pointing device, a scanner, or a networking device such as a switch or router, e.g., through a network adapter.

The system 130 may be implemented in a number of different forms, as shown in FIG. 1. For example, it may be implemented as a standard server, or multiple times in a group of such servers. Additionally, the system 130 may also be implemented as part of a rack server system or a personal computer such as a laptop computer. Alternatively, components from system 130 may be combined with one or more other same or similar systems and an entire system 140 may be made up of multiple computing devices communicating with each other.

FIG. 1 also illustrates a user input system 140, in accordance with an embodiment of the invention. The user input system 140 includes a processor 152, memory 154, an input/output device such as a display 156, a communication interface 158, and a transceiver 160, among other components. The user input system 140 may also be provided with a storage device, such as a microdrive or other device, to provide additional storage. Each of the components 152, 154, 158, and 160, are interconnected using various buses, and several of the components may be mounted on a common motherboard or in other manners as appropriate.

The processor 152 is configured to execute instructions within the user input system 140, including instructions stored in the memory 154. The processor may be implemented as a chipset of chips that include separate and multiple analog and digital processors. The processor may be configured to provide, for example, for coordination of the other components of the user input system 140, such as control of user interfaces, applications run by user input system 140, and wireless communication by user input system 140.

The processor 152 may be configured to communicate with the user through control interface 164 and display interface 166 coupled to a display 156. The display 156 may be, for example, a TFT LCD (Thin-Film-Transistor Liquid Crystal Display) or an OLED (Organic Light Emitting Diode) display, or other appropriate display technology. The display interface 156 may comprise appropriate circuitry and configured for driving the display 156 to present graphical and other information to a user. The control interface 164 may receive commands from a user and convert them for submission to the processor 152. In addition, an external interface 168 may be provided in communication with processor 152, so as to enable near area communication of user input system 140 with other devices. External interface 168 may provide, for example, for wired communication in some implementations, or for wireless communication in other implementations, and multiple interfaces may also be used.

The memory 154 stores information within the user input system 140. The memory 154 can be implemented as one or more of a computer-readable medium or media, a volatile memory unit or units, or a non-volatile memory unit or units. Expansion memory may also be provided and connected to user input system 140 through an expansion interface (not shown), which may include, for example, a SIMM (Single In Line Memory Module) card interface. Such expansion memory may provide extra storage space for user input system 140, or may also store applications or other information therein. In some embodiments, expansion memory may include instructions to carry out or supplement the processes described above, and may include secure information also. For example, expansion memory may be provided as a security module for user input system 140, and may be programmed with instructions that permit secure use of user input system 140. In addition, secure applications may be provided via the SIMM cards, along with additional information, such as placing identifying information on the SIMM card in a non-hackable manner. In some embodiments, the user may use the applications to execute processes described with respect to the process flows described herein. Specifically, the application executes the process flows described herein. It will be understood that the one or more applications stored in the system 130 and/or the user computing system 140 may interact with one another and may be configured to implement any one or more portions of the various user interfaces and/or process flow described herein.

The memory 154 may include, for example, flash memory and/or NVRAM memory. In one aspect, a computer program product is tangibly embodied in an information carrier. The computer program product contains instructions that, when executed, perform one or more methods, such as those described herein. The information carrier is a computer-or machine-readable medium, such as the memory 154, expansion memory, memory on processor 152, or a propagated signal that may be received, for example, over transceiver 160 or external interface 168.

In some embodiments, the user may use the user input system 140 to transmit and/or receive information or commands to and from the system 130. In this regard, the system 130 may be configured to establish a communication link with the user input system 140, whereby the communication link establishes a data channel (wired or wireless) to facilitate the transfer of data between the user input system 140 and the system 130. In doing so, the system 130 may be configured to access one or more aspects of the user input system 140, such as, a GPS device, an image capturing component (e.g., camera), a microphone, a speaker, or the like.

The user input system 140 may communicate with the system 130 (and one or more other devices) wirelessly through communication interface 158, which may include digital signal processing circuitry where necessary. Communication interface 158 may provide for communications under various modes or protocols, such as GSM voice calls, SMS, EMS, or MMS messaging, CDMA, TDMA, PDC, WCDMA, CDMA2000, or GPRS, among others. Such communication may occur, for example, through radio-frequency transceiver 160. In addition, short-range communication may occur, such as using a Bluetooth, Wi-Fi, or other such transceiver (not shown). In addition, GPS (Global Positioning System) receiver module 170 may provide additional navigation- and location-related wireless data to user input system 140, which may be used as appropriate by applications running thereon, and in some embodiments, one or more applications operating on the system 130.

The user input system 140 may also communicate audibly using audio codec 162, which may receive spoken information from a user and convert it to usable digital information. Audio codec 162 may likewise generate audible sound for a user, such as through a speaker, e.g., in a handset of user input system 140. Such sound may include sound from voice telephone calls, may include recorded sound (e.g., voice messages, music files, etc.) and may also include sound generated by one or more applications operating on the user input system 140, and in some embodiments, one or more applications operating on the system 130.

Various implementations of the systems and techniques described here can be realized in digital electronic circuitry, integrated circuitry, specially designed ASICs (application specific integrated circuits), computer hardware, firmware, software, and/or combinations thereof. These various implementations can include implementation in one or more computer programs that are executable and/or interpretable on a programmable system including at least one programmable processor, which may be special or general purpose, coupled to receive data and instructions from, and to transmit data and instructions to, a storage system, at least one input device, and at least one output device.

These computer programs (also known as programs, software, software applications or code) include machine instructions for a programmable processor, and can be implemented in a high-level procedural and/or object-oriented programming language, and/or in assembly/machine language. As used herein, the terms "machine-readable medium" "computer-readable medium" refers to any computer program product, apparatus and/or device (e.g., magnetic discs, optical disks, memory, Programmable Logic Devices (PLDs)) used to provide machine instructions and/or data to a programmable processor, including a machine-readable medium that receives machine instructions as a machine-readable signal. The term "machine-readable signal" refers to any signal used to provide machine instructions and/or data to a programmable processor.

To provide for interaction with a user, the systems and techniques described here can be implemented on a computer having a display device (e.g., a CRT (cathode ray tube) or LCD (liquid crystal display) monitor) for displaying information to the user and a keyboard and a pointing device (e.g., a mouse or a trackball) by which the user can provide input to the computer. Other kinds of devices can be used to provide for interaction with a user as well; for example, feedback provided to the user can be any form of sensory feedback (e.g., visual feedback, auditory feedback, or tactile feedback); and input from the user can be received in any form, including acoustic, speech, or tactile input.

The systems and techniques described here can be implemented in a computing system that includes a back end component (e.g., as a data server), or that includes a middleware component (e.g., an application server), or that includes a front end component (e.g., a client computer having a graphical user interface or a Web browser through which a user can interact with an implementation of the systems and techniques described here), or any combination of such back end, middleware, or front end components. The components of the system can be interconnected by any form or medium of digital data communication (e.g., a communication network). Examples of communication networks include a local area network ("LAN"), a wide area network ("WAN"), and the Internet.

The computing system can include clients and servers. A client and server are generally remote from each other and typically interact through a communication network. The relationship of client and server arises by virtue of computer programs running on the respective computers and having a client-server relationship to each other.

It will be understood that the embodiment of the system environment illustrated in FIG. 1 is exemplary and that other embodiments may vary. As another example, in some embodiments, the system 130 includes more, less, or different components. As another example, in some embodiments, some or all of the portions of the system environment 100 may be combined into a single portion. Likewise, in some embodiments, some or all of the portions of the system 130 may be separated into two or more distinct portions.

In deep learning, a convolutional neural network (CNN, or ConvNet) is a class of deep neural networks, most commonly applied to analyzing visual imagery. OCR (optical character recognition) is the recognition of printed or written text characters by a computer. This involves photo-scanning of the text character-by-character, analysis of the scanned-in image, and then translation of the character image into character codes, such as ASCII, commonly used in data processing. CNNs can be leveraged to recognize text characters without the need to photo-scan the text character-by-character.

FIG. 2 illustrate a process flow for extracting features from high resolution images generated from documents 200, in accordance with an embodiment of the invention. As shown in block 202, the process flow includes electronically retrieving one or more documents from a document repository, wherein the one or more documents are in an image format. In some embodiments, the one or more documents retrieved from the document repository may be in one or more unique formats. In one aspect, the one or more unique formats may include one or more unique fonts. In such cases, the system may be configured to initiate a data normalization algorithm on the one or more documents. In response, the system may be configured to normalize, using the data normalization algorithm, the one or more documents. In one aspect, normalizing the one or more documents may include transforming the one or more unique formats associated with the one or more documents to a common formation. In some embodiments, normalizing the one or more documents may include transforming the one or more fonts to a first font. In response to normalizing the one or more documents, the system may be configured to generate one or more images of the one or more documents. In some embodiments, the one or more images of the one or more documents may have a low resolution. To address this issue, and also make the resolution of the images of documents consistent, the system may be configured to recover the high-resolution image of the document from its low resolution counterpart.

Next, as shown in block 204, the process flow includes initiating one or more image super resolution algorithms on the one or more documents. In some embodiments, the one or more image super resolution algorithms may be configured to recover a high-resolution image from a low-resolution image. In one aspect, the system may be configured to implement any applicable image super resolution algorithm capable of converting the low resolution image of the documents to a high resolution image. In some embodiments, the image super resolution algorithms may be prediction model based, edge based, image statistical model based, and/or patch (or example-based) methods. Any suitable image super resolution approach can otherwise be incorporated in the system 130. Further, any suitable image super resolution model can be used in generating data relevant to the system 130.

Next, as shown in block 206, the process flow includes generating, based on at least the one or more image super resolution algorithms, one or more high-resolution images associated with each of the one or more documents. In some embodiments, the image super resolution algorithms may be implemented using convolutional neural networks (CNN) due to its success in image classification and other applications in the computer vision fields, such as object detection, face recognition, and pedestrian detection. The efficient training implementation on modern powerful graphics processing unit (GPU) and the use of Rectified Linear Unit (ReLU) which makes convergence much faster while presenting good quality are some of the advantages of using CNN to implement the image super resolution algorithms. Accordingly, recovering a high-resolution image from a low-resolution image may be formulated using CNNs. The resulting image super resolution convolutional neural network (SRCNN) is configured to recover the high-resolution image of the document from its low-resolution counterpart in three steps, namely, patch extraction and representation, non-linear mapping, and reconstruction. In the patch extraction and representation step, the SRCNN extracts overlapping patches from the low resolution document. In response to extracting the patches, the SRCNN represents each patch as a high-dimensional vector. These vectors may comprise a set of feature maps, of which the number equals to the dimensionality of the vectors. Next, in the non-linear mapping step, the SRCNN non-linearly maps each high-dimensional vector onto another high-dimensional vector. Each mapped vector is conceptually the representation of a high-resolution patch. These vectors may comprise another set of feature maps. Next, in the reconstruction step, the high-resolution patch wise representations are aggregated to generate the final high-resolution image. In this way, the system may be configured to generate the one or more high-resolution images associated with each of the one or more documents.

Next, as shown in block 208, the process flow includes initiating one or more image bottleneck ensembles (IBE) algorithms on the one or more high-resolution images. In some embodiments, the one or more IBE algorithms may include one or more convolutional neural networks (CNN). In deep learning CNN in a class of deep neural networks, most commonly applied to analyzing visual imagery. A CNN consists of an input and an output layer, as well as multiple hidden layers. The hidden layers of a CNN typically consist of a series of convolutional layers that convolve with a multiplication or other dot product. The activation function is commonly a ReLU layer, and is subsequently followed by additional convolutions such as pooling layers, fully connected layers and normalization layers, referred to as hidden layers because their inputs and outputs are masked by the activation function and final convolution. In some embodiments, the system may be configured to implement any of the following applicable CNN architectures either singly or in combination: Visual Geometry Group (VGG) 16, InceptionNet, ResNet50, Xception, InceptionResNetV3, ResNeXt50, WaveNet, and/or the like. Alternatively, any suitable deep CNN architectures can otherwise be incorporated in the system 130. Further, any suitable deep CNN architecture can be used in generating data relevant to the system 130.

Next, as shown in block 210, the process flow includes extracting, using the one or more IBE algorithms, one or more features associated with the one or more high resolution images. In some embodiments, the one or more features associated with the one or more high resolution images associated with the one or more documents may include one or more sets of ordered points that define one or more contours of one or more portions of the one or more high resolution images associated with the one or more documents. By extracting the one or more contours of the one or more portions of the one or more high resolution images associated with the one or more documents, the system may be configured to generate one or more features.

In some embodiments, the system may be configured to process the one or more high resolution images using the one or more IBE algorithms in parallel. In this regard, the system may be configured to extract one or more preliminary features associated with the one or more high resolution images from each of the one or more IBE algorithms based on at least processing the one or more high resolution images using the one or more IBE algorithms in parallel. In response to extracting the one or more preliminary features from each of the one or more IBE algorithms, the system may be configured to concatenate the one or more preliminary features to generate the one or more features associated with the one or more high resolution images. In some embodiments, the system may be configured to replace a final convolution layer in each of the one or more IBE algorithms with a bottleneck layer so the inference time could be kept low while providing rich combination of features. In some embodiments, a bottleneck layer contains fewer nodes compared to the previous layers in the CNN architecture to obtain a representation of the input with reduced dimensionality.

In some embodiments, the system may be configured to implement one or more CNN architectures that are capable of retaining the sequential representation of the one or more high resolution images associated with the one or more documents in addition to extracting the one or more features from the one or more high resolution images associated with the one or more documents. For example, as the high resolution images are processed, the one or more IBE algorithms may be configured to traverse the one or more high resolution images associated with the one or more documents to extract features from various portions of the high resolution images associated with the one or more documents. For example, a high resolution image of the document may be a letterhead which has portions such as a heading, signature block, subject line, greeting, body, and/or the like. By implementing IBE algorithms such as WaveNet, the system may be configured to retain the sequence in which the features are extracted from the one or more high resolution images associated with the one or more documents.

Next, as shown in block 212, the process flow includes storing the one or more features extracted from the one or more high resolution images in a feature repository.

FIG. 3 illustrates a process flow for extracting features from an image of a query 300, in accordance with an embodiment of the invention. As shown in block 302, the process flow includes electronically receiving a query from a computing device associated with a user, wherein the query is in a text format. In one aspect, the query may be associated an original font. Similar to initiating the data normalization algorithm on the one or more documents, the system may be configured to initiate the data normalization algorithm on the query. In response, the system may be configured to normalize, using the data normalization algorithm, the query. In one aspect, normalizing the query may include transforming the original font of the query to the first font.

Next, as shown in block 304, the process flow includes generating an image of the query, wherein generating further comprises converting the query from the text format to an image format. Next, as shown in block 306, the process flow includes initiating initiate one or more feature extraction algorithms on the image of the query. Next, as shown in block 308, the process flow includes extracting, using the one or more feature extraction algorithms, one or more features associated with the image of the query. Similar to the features extracted from one or more high resolution images associated with the one or more documents, the one or more features associated with the image of the query may include one or more sets of ordered points that define one or more contours of one or more portions of the image of the query. By extracting the one or more contours of the one or more portions of the image of the query, the system may be configured to generate one or more features. In some embodiments, the system may be configured to implement one or more machine learning algorithms for feature extraction and classification to extract the features from the image of the query. In some embodiments, the system may be configured to implement any of the following applicable machine learning algorithms either singly or in combination: supervised learning (e.g., using logistic regression, using back propagation neural networks, using random forests, decision trees, etc.), unsupervised learning (e.g., using an Apriori algorithm, using K-means clustering), semi-supervised learning, reinforcement learning (e.g., using a Q-learning algorithm, using temporal difference learning), and any other suitable learning style. Each module of the plurality can implement any one or more of: a regression algorithm (e.g., ordinary least squares, logistic regression, stepwise regression, multivariate adaptive regression splines, locally estimated scatterplot smoothing, etc.), an instance-based method (e.g., k-nearest neighbor, learning vector quantization, self-organizing map, etc.), a regularization method (e.g., ridge regression, least absolute shrinkage and selection operator, elastic net, etc.), a decision tree learning method (e.g., classification and regression tree, iterative dichotomiser 3, C4.5, chi-squared automatic interaction detection, decision stump, random forest, multivariate adaptive regression splines, gradient boosting machines, etc.), a Bayesian method (e.g., naive Bayes, averaged one-dependence estimators, Bayesian belief network, etc.), a kernel method (e.g., a support vector machine, a radial basis function, a linear discriminate analysis, etc.), a clustering method (e.g., k-means clustering, expectation maximization, etc.), an associated rule learning algorithm (e.g., an Apriori algorithm, an Eclat algorithm, etc.), an artificial neural network model (e.g., a Perceptron method, a back-propagation method, a Hopfield network method, a self-organizing map method, a learning vector quantization method, etc.), a deep learning algorithm (e.g., a restricted Boltzmann machine, a deep belief network method, a convolution network method, a stacked auto-encoder method, etc.), a dimensionality reduction method (e.g., principal component analysis, partial least squares regression, Sammon mapping, multidimensional scaling, projection pursuit, etc.), an ensemble method (e.g., boosting, bootstrapped aggregation, AdaBoost, stacked generalization, gradient boosting machine method, random forest method, etc.), and any suitable form of machine learning algorithm. Each processing portion of the system 100 can additionally or alternatively leverage: a probabilistic module, heuristic module, deterministic module, or any other suitable module leveraging any other suitable computation method, machine learning method or combination thereof. However, any suitable machine learning approach can otherwise be incorporated in the system 100. Further, any suitable model (e.g., machine learning, non-machine learning, etc.) can be used in generating data relevant to the system 130.

FIG. 4 illustrates a process flow for character recognition in high resolution images 400, in accordance with an embodiment of the invention, in accordance with an embodiment of the invention. As shown in block 402, the process flow includes electronically retrieving the one or more features associated with the one or more high resolution images from the feature repository. Next, as shown in block 404, the process flow include initiating a sliding window matching algorithm on the one or more features associated with the one or more high resolution images and the one or more features associated with the image of the query. In this regard, the system may be configured to establish a window with a scale of a predetermined width. In some embodiments, the predetermined width associated with the window is based on at least a length of the query after the query has been transformed to a first font. The system may then be configured to traverse or slide, sequentially, the window across the surface of the one or more high resolution images associated with the one or more documents in predetermined incremental steps. At each predetermined incremental step, the system may be configured to identify at least a portion of the one or more features associated with the one or more high resolution images associated with the one or more documents within the window.

Next, as shown in block 406, the process flow includes comparing, using the sliding window matching algorithm, the one or more features associated with the image of the query with the one or more features associated with the one or more high resolution images associated with the one or more documents. In some embodiments, the system may be configured to compare the one or more features associated with the image of the query with at least the portion of the one or more features associated with the one or more high resolution images identified within the window at each of the one or more predetermined incremental steps. By comparing the features extracted from the high resolution images with the features extracted from the image of the query, the system may be configured to eliminate any outliers affecting the matching step. For example, assume that the objective is to identify any incidences of the query, "0000XXXX" in a document. The features extracted from "0000XXXX" may include a number of ordered points that define the contours of the image, such as the curves in "0" and the crossing in "X." However, these individual features could be found in other positions in the document individually or in some combination dissimilar to that of the combination in the query causing outlier matches. By implementing a sliding window comparison, these outlier matches can be eliminated.

Next, as shown in block 408, the process flow includes determining one or more matches between the one or more features associated with the one or more images of the query and the one or more features associated with the one or more high resolution images. In some embodiments, the system may be configured to determine the one or more matches between the one or more images of the query and at least the portion of the one or more features associated with the one or more high resolution images identified within the scale at each of the one or more predetermined incremental steps. Following the previous example, a match is determined when a significant portion of the features in the image of the query matches a significant portion of the high resolution document with a sufficiently high similarity index. In some embodiments, the system may be configured to determine the similarity index between the one or more features associated with the image of the query and the one or more features associated with the one or more high resolution images associated with the one or more documents based on at least a distance analysis. In one aspect, the distance analysis may be based on one or more distance measures, such as, Euclidean distance, Manhattan distance, Pearson Correlation distance, cosine distance, Spearman correlation distance, and/or the like. Accordingly, the system may be configured to compare the similarity index of the matching between the features of the image of the query with the features of the high resolution image to a predetermined similarity threshold. In one aspect, the predetermined similarity threshold may be a threshold distance measure. A lower threshold distance indicates that the features are closer to each other and are thus have a higher similarity index. On the other hand, a higher threshold distance indicates that the features are farther away from each other and thus have a lower similarity index. In addition, the system may be configured to compare the number of features of the image of the query that match the features of the high resolution image with a threshold number to determine whether the query is identified in the document. If both the number of features and the similarity index meet their respective predetermined thresholds, then the system may be configured to determine a match.

In some embodiments, the system may be configured to index at least one of the one or more documents based on at least determining the one or more matches between the one or more features associated with the one or more images of the query and the one or more features associated with the one or more high resolution images.

As will be appreciated by one of ordinary skill in the art in view of this disclosure, the present invention may include and/or be embodied as an apparatus (including, for example, a system, machine, device, computer program product, and/or the like), as a method (including, for example, a business method, computer-implemented process, and/or the like), or as any combination of the foregoing. Accordingly, embodiments of the present invention may take the form of an entirely business method embodiment, an entirely software embodiment (including firmware, resident software, micro-code, stored procedures in a database, or the like), an entirely hardware embodiment, or an embodiment combining business method, software, and hardware aspects that may generally be referred to herein as a "system." Furthermore, embodiments of the present invention may take the form of a computer program product that includes a computer-readable storage medium having one or more computer-executable program code portions stored therein. As used herein, a processor, which may include one or more processors, may be "configured to" perform a certain function in a variety of ways, including, for example, by having one or more general-purpose circuits perform the function by executing one or more computer-executable program code portions embodied in a computer-readable medium, and/or by having one or more application-specific circuits perform the function.

It will be understood that any suitable computer-readable medium may be utilized. The computer-readable medium may include, but is not limited to, a non-transitory computer-readable medium, such as a tangible electronic, magnetic, optical, electromagnetic, infrared, and/or semiconductor system, device, and/or other apparatus. For example, in some embodiments, the non-transitory computer-readable medium includes a tangible medium such as a portable computer diskette, a hard disk, a random access memory (RAM), a read-only memory (ROM), an erasable programmable read-only memory (EPROM or Flash memory), a compact disc read-only memory (CD-ROM), and/or some other tangible optical and/or magnetic storage device. In other embodiments of the present invention, however, the computer-readable medium may be transitory, such as, for example, a propagation signal including computer-executable program code portions embodied therein.

One or more computer-executable program code portions for carrying out operations of the present invention may include object-oriented, scripted, and/or unscripted programming languages, such as, for example, Java, Perl, Smalltalk, C++, SAS, SQL, Python, Objective C, JavaScript, and/or the like. In some embodiments, the one or more computer-executable program code portions for carrying out operations of embodiments of the present invention are written in conventional procedural programming languages, such as the "C" programming languages and/or similar programming languages. The computer program code may alternatively or additionally be written in one or more multi-paradigm programming languages, such as, for example, F#.

Some embodiments of the present invention are described herein with reference to flowchart illustrations and/or block diagrams of apparatus and/or methods. It will be understood that each block included in the flowchart illustrations and/or block diagrams, and/or combinations of blocks included in the flowchart illustrations and/or block diagrams, may be implemented by one or more computer-executable program code portions. These one or more computer-executable program code portions may be provided to a processor of a general purpose computer, special purpose computer, and/or some other programmable data processing apparatus in order to produce a particular machine, such that the one or more computer-executable program code portions, which execute via the processor of the computer and/or other programmable data processing apparatus, create mechanisms for implementing the steps and/or functions represented by the flowchart(s) and/or block diagram block(s).

The one or more computer-executable program code portions may be stored in a transitory and/or non-transitory computer-readable medium (e.g. a memory) that can direct, instruct, and/or cause a computer and/or other programmable data processing apparatus to function in a particular manner, such that the computer-executable program code portions stored in the computer-readable medium produce an article of manufacture including instruction mechanisms which implement the steps and/or functions specified in the flowchart(s) and/or block diagram block(s).

The one or more computer-executable program code portions may also be loaded onto a computer and/or other programmable data processing apparatus to cause a series of operational steps to be performed on the computer and/or other programmable apparatus. In some embodiments, this produces a computer-implemented process such that the one or more computer-executable program code portions which execute on the computer and/or other programmable apparatus provide operational steps to implement the steps specified in the flowchart(s) and/or the functions specified in the block diagram block(s). Alternatively, computer-implemented steps may be combined with, and/or replaced with, operator- and/or human-implemented steps in order to carry out an embodiment of the present invention.

Although many embodiments of the present invention have just been described above, the present invention may be embodied in many different forms and should not be construed as limited to the embodiments set forth herein; rather, these embodiments are provided so that this disclosure will satisfy applicable legal requirements. Also, it will be understood that, where possible, any of the advantages, features, functions, devices, and/or operational aspects of any of the embodiments of the present invention described and/or contemplated herein may be included in any of the other embodiments of the present invention described and/or contemplated herein, and/or vice versa. In addition, where possible, any terms expressed in the singular form herein are meant to also include the plural form and/or vice versa, unless explicitly stated otherwise. Accordingly, the terms "a" and/or "an" shall mean "one or more," even though the phrase "one or more" is also used herein. Like numbers refer to like elements throughout.

While certain exemplary embodiments have been described and shown in the accompanying drawings, it is to be understood that such embodiments are merely illustrative of and not restrictive on the broad invention, and that this invention not be limited to the specific constructions and arrangements shown and described, since various other changes, combinations, omissions, modifications and substitutions, in addition to those set forth in the above paragraphs, are possible. Those skilled in the art will appreciate that various adaptations, modifications, and combinations of the just described embodiments can be configured without departing from the scope and spirit of the invention. Therefore, it is to be understood that, within the scope of the appended claims, the invention may be practiced other than as specifically described herein.

What is claimed is:

1. A system for character recognition in a digital image processing environment, the system comprising:
   at least one non-transitory storage device; and
   at least one processing device coupled to the at least one non-transitory storage device, wherein the at least one processing device is configured to:
   electronically retrieve one or more documents from a document repository, wherein the one or more documents are in an image format;
   initiate one or more image super resolution algorithms on the one or more documents;
   generate, based on at least the one or more image super resolution algorithms, one or more high-resolution images associated with each of the one or more documents; initiate one or more image bottleneck ensembles (IBE) algorithms on the one or more high-resolution images;
   extract, using the one or more IBE algorithms, one or more features associated with the one or more high resolution images;
   store the one or more features extracted from the one or more high resolution images in a feature repository;
   electronically receive a query from a computing device of a user, wherein the query is in a text format, wherein the query is associated with a first font;
   normalize the query by transforming the first font of the query to a second font; and
   generate an image of the query, wherein the query is associated with the second font.

2. The system of claim 1, wherein the at least one processing device is further configured to:
   electronically receive the query from the computing device associated with the user, wherein the query is in a text format;
   generate the image of the query, wherein generating further comprises converting the query from the text format to an image format;
   initiate one or more feature extraction algorithms on the image of the query; and
   extract, using the one or more feature extraction algorithms, one or more features associated with the image of the query.

3. The system of claim 2, wherein the one or more features associated with the image of the query comprises one or more sets of ordered points that define one or more contours of one or more portions of the image of the query.

4. The system of claim 2, wherein the at least one processing device is further configured to:
   determine that the one or more documents retrieved from the document repository are associated with one or more unique fonts;
   initiate a data normalization algorithm on the one or more documents;
   normalize, using the data normalization algorithm, the one or more documents, wherein normalizing further comprises at least transforming the one or more fonts to the second font; and
   initiate the one or more image super resolution algorithms on the one or more documents, wherein the one or more documents are associated with the second font.

5. The system of claim 1, wherein the at least one processing device is further configured to:
   electronically retrieve the one or more features associated with the one or more high resolution images from the feature repository;
   initiate a sliding window matching algorithm on the one or more features associated with the one or more high resolution images and the one or more features associated with the image of the query;
   compare, using the sliding window matching algorithm, the one or more features associated with the image of the query with the one or more features associated with the one or more high resolution images; and
   determine one or more matches between the one or more features associated with the one or more images of the query and the one or more features associated with the one or more high resolution images.

6. The system of claim 5, wherein the at least one processing device is further configured to initiate the sliding window matching algorithm, wherein initiating further comprises:
- establishing a window with a scale of a predetermined width;
- sliding, sequentially, the window across a surface of the one or more high resolution images at one or more predetermined incremental steps;
- identifying at least a portion of the one or more features associated with the one or more high resolution images within the window at each of the one or more predetermined incremental steps;
- comparing the one or more features associated with the image of the query with at least the portion of the one or more features associated with the one or more high resolution images identified within the window at each of the one or more predetermined incremental steps; and
- determine the one or more matches between the one or more images of the query and at least the portion of the one or more features associated with the one or more high resolution images identified within the scale at each of the one or more predetermined incremental steps.

7. The system of claim 6, wherein the predetermined width associated with the window is based on at least a length of the query, wherein the query is associated with the second font.

8. The system of claim 1, wherein the at least one processing device is further configured to extract the one or more features associated with the one or more high resolution images, wherein extracting further comprises:
- initiating the one or more IBE algorithms on the one or more high resolution images, wherein the one or more IBE algorithms comprises at least one or more convolutional neural networks;
- processing, in parallel, the one or more high resolution images using the one or more IBE algorithms;
- extracting one or more preliminary features associated with the one or more high resolution images from each of the one or more IBE algorithms based on at least processing the one or more high resolution images using the one or more IBE algorithms; and
- concatenating the one or more preliminary features to generate the one or more features associated with the one or more high resolution images.

9. A computer program product for character recognition in a digital image processing environment, the computer program product comprising a non-transitory computer-readable medium comprising code causing a first apparatus to:
- electronically retrieve one or more documents from a document repository, wherein the one or more documents are in an image format;
- initiate one or more image super resolution algorithms on the one or more documents;
- generate, based on at least the one or more image super resolution algorithms, one or more high-resolution images associated with each of the one or more documents;
- initiate one or more image bottleneck ensembles (IBE) algorithms on the one or more high-resolution images;
- extract, using the one or more IBE algorithms, one or more features associated with the one or more high resolution images;
- store the one or more features extracted from the one or more high resolution images in a feature repository;
- electronically receive a query from a computing device of a user, wherein the query is in a text format, wherein the query is associated with a first font;
- normalize the query by transforming the first font of the query to a second font; and
- generate an image of the query, wherein the query is associated with the second font.

10. The computer program product of claim 9, wherein the first apparatus is further configured to:
- electronically receive the query from the computing device associated with the user, wherein the query is in a text format;
- generate the image of the query, wherein generating further comprises converting the query from the text format to an image format;
- initiate one or more feature extraction algorithms on the image of the query; and
- extract, using the one or more feature extraction algorithms, one or more features associated with the image of the query.

11. The computer program product of claim 10, wherein the one or more features associated with the image of the query comprises one or more sets of ordered points that define one or more contours of one or more portions of the image of the query.

12. The computer program product of claim 10, wherein the first apparatus is further configured to:
- determine that the one or more documents retrieved from the document repository are associated with one or more unique fonts;
- initiate a data normalization algorithm on the one or more documents;
- normalize, using the data normalization algorithm, the one or more documents, wherein normalizing further comprises at least transforming the one or more fonts to the second font; and
- initiate the one or more image super resolution algorithms on the one or more documents, wherein the one or more documents are associated with the second font.

13. The computer program product of claim 10, wherein the first apparatus is further configured to to initiate a data normalization algorithm on the query transform the first font of the query to the second font using the data normalization algorithm.

14. The computer program product of claim 13, wherein the first apparatus is further configured to:
- electronically retrieve the one or more features associated with the one or more high resolution images from the feature repository;
- initiate a sliding window matching algorithm on the one or more features associated with the one or more high resolution images and the one or more features associated with the image of the query;
- compare, using the sliding window matching algorithm, the one or more features associated with the image of the query with the one or more features associated with the one or more high resolution images; and
- determine one or more matches between the one or more features associated with the one or more images of the query and the one or more features associated with the one or more high resolution images.

15. The computer program product of claim 14, wherein the first apparatus is further configured to initiate the sliding window matching algorithm, wherein initiating further comprises:
- establishing a window with a scale of a predetermined width;
- sliding, sequentially, the window across a surface of the one or more high resolution images at one or more predetermined incremental steps;
- identifying at least a portion of the one or more features associated with the one or more high resolution images within the window at each of the one or more predetermined incremental steps;
- comparing the one or more features associated with the image of the query with at least the portion of the one or more features associated with the one or more high resolution images identified within the window at each of the one or more predetermined incremental steps; and
- determine the one or more matches between the one or more images of the query and at least the portion of the one or more features associated with the one or more high resolution images identified within the scale at each of the one or more predetermined incremental steps.

16. The computer program product of claim 15, wherein the predetermined width associated with the window is based on at least a length of the query, wherein the query is associated with the second font.

17. The computer program product of claim 9, wherein the first apparatus is further configured to extract the one or more features associated with the one or more high resolution images, wherein extracting further comprises:
- initiating the one or more IBE algorithms on the one or more high resolution images, wherein the one or more IBE algorithms comprises at least one or more convolutional neural networks;
- processing, in parallel, the one or more high resolution images using the one or more IBE algorithms;
- extracting one or more preliminary features associated with the one or more high resolution images from each of the one or more IBE algorithms based on at least processing the one or more high resolution images using the one or more IBE algorithms; and
- concatenating the one or more preliminary features to generate the one or more features associated with the one or more high resolution images.

18. A method for character recognition in a digital image processing environment, the method comprising:
- electronically retrieving one or more documents from a document repository, wherein the one or more documents are in an image format;
- initiating one or more image super resolution algorithms on the one or more documents;
- generating, based on at least the one or more image super resolution algorithms, one or more high-resolution images associated with each of the one or more documents;
- initiating one or more image bottleneck ensembles (IBE) algorithms on the one or more high-resolution images;
- extracting, using the one or more IBE algorithms, one or more features associated with the one or more high resolution images;
- storing the one or more features extracted from the one or more high resolution images in a feature repository;
- electronically receiving a query from a computing device of a user, wherein the query is in a text format, wherein the query is associated with a first font;
- normalizing the query by transforming the first font of the query to a second font; and
- generating an image of the query, wherein the query is associated with the second font.

19. The method of claim 18, wherein the method further comprises:
- electronically receiving the query from the computing device associated with the user, wherein the query is in a text format;
- generating the image of the query, wherein generating further comprises converting the query from the text format to an image format;
- initiating one or more feature extraction algorithms on the image of the query; and
- extracting, using the one or more feature extraction algorithms, one or more features associated with the image of the query.

* * * * *